United States Patent [19]

Troughton, Jr. et al.

[11] Patent Number: 5,162,156

[45] Date of Patent: Nov. 10, 1992

[54] PHENOLIC RESIN ADHESION PROMOTERS AND ADHESIVE COMPOSITIONS, AND BONDING METHOD EMPLOYING SAME

[75] Inventors: Ernest B. Troughton, Jr., Cary, N.C.; Helmut W. Kucera, West Springfield, Pa.

[73] Assignee: Lord Corporation, Erie, Pa.

[21] Appl. No.: 586,631

[22] Filed: Sep. 21, 1990

[51] Int. Cl.$^5$ ............................ B32B 15/08; C09J 5/04
[52] U.S. Cl. ................................... 428/460; 156/315; 156/333; 156/335; 525/135; 528/155
[58] Field of Search ............... 428/460; 525/135; 156/315, 335, 333; 528/155

[56] References Cited

U.S. PATENT DOCUMENTS

| | | | |
|---|---|---|---|
| 2,385,373 | 9/1945 | Rhodes | 528/155 |
| 2,478,943 | 8/1949 | Rhodes | 156/335 |
| 3,258,388 | 6/1966 | Coleman et al. | |
| 3,258,389 | 6/1966 | Coleman et al. | |
| 3,371,008 | 2/1968 | Lopez | |
| 3,704,200 | 11/1972 | Brown | 528/155 |
| 4,139,693 | 2/1979 | Schoenberg | |
| 4,167,500 | 9/1979 | Jazenski et al. | 156/335 |
| 4,195,140 | 3/1980 | Sexsmith et al. | |
| 4,383,005 | 5/1983 | Weil et al. | |
| 4,724,249 | 2/1988 | Roberts | |
| 5,023,311 | 6/1991 | Kubota | 528/155 |

FOREIGN PATENT DOCUMENTS 1045118 4/1965 United Kingdom.

Primary Examiner—John J. Gallagher
Attorney, Agent, or Firm—W. Graham Buie

[57] ABSTRACT

An adhesion promoting composition for enhancing adhesion between an elastomeric substrate and a metal surface which, when applied at least in substantial contact with the metal surface, produces an elastomer-metal adhesive bond that withstands high temperature fluid and corrosive material environments and that can be applied without extensive pretreatment of the metal surface. The adhesion promoting composition comprises a phenolic resin derived from a first phenolic component, a second phenolic component, and a formaldehyde source, wherein the first phenolic component is a monohydroxy aromatic compound, a dihydroxy aromatic compound or a combination thereof, and the second phenolic component is a trihydroxy aromatic compound. A two-part adhesive composition containing a primer component and an overcoat component is also disclosed. The primer component contains the adhesion promoting composition and a first halogenated polyolefin while the overcoat component contains a second halogenated polyolefin and a nitroso compound.

28 Claims, No Drawings

PHENOLIC RESIN ADHESION PROMOTERS AND ADHESIVE COMPOSITIONS, AND BONDING METHOD EMPLOYING SAME

FIELD OF THE INVENTION

This invention relates to the bonding of metal surfaces to elastomeric substrates with the use of appropriate adhesive compositions. More specifically, the present invention relates to phenolic resins derived from certain polyhydroxy aromatic compounds and the use of the phenolic resins to enhance adhesion between elastomeric and metal surfaces. The invention further relates to a novel adhesive composition based on the phenolic resin adhesion promoters.

BACKGROUND OF THE INVENTION

The bonding of metal surfaces to elastomeric substrates is an evolving art that requires continual advancement and modification of corresponding adhesive systems in order to cope with the rapidly changing automotive and industrial environments in which elastomer-metal assemblies are employed. Recent technological advances in automotive and industrial applications have resulted in relatively severe working environments for adhesively bonded elastomer and metal components. For example, many engine mounting devices that employ elastomer-metal adhesive bonds contain fluids in order to assist in damping of the vibration of the engine. These fluid-filled engine mounting devices are being exposed to increasingly high temperatures such that the elastomer-metal adhesive bonds within the mounts are being exposed to very high temperature fluid environments. In addition, many elastomer-metal assemblies, particularly those utilized in automobile applications, are routinely exposed to materials that contain corrosive salts or other corrosive materials that may act to degrade the elastomer-metal adhesive bond.

In order to effectively apply many of the currently available elastomer-metal adhesive compositions, it is necessary to pretreat the metal surface so as to remove any dirt, oil, moisture or weak oxide layers by utilizing one or more surface preparation techniques such as phosphatizing, alodizing, anodizing, solvent cleaning, grit blasting or vapor degreasing. Most adhesive compositions require that the metal surface be both degreased and grit-blasted before an adequate adhesive bond can be obtained. These techniques are relatively expensive, time-consuming, and some techniques may generate hazardous products such as chromates which create significant waste disposal problems. With increasing environmental awareness and the corresponding regulation of industry, the use of adhesive compositions which require substantial surface preparation will become increasingly expensive and cumbersome. It would, therefore, be desirable to create an adhesive composition that would eliminate the need for one or more of the above-mentioned metal surface preparation techniques.

Various adhesive compositions have previously been developed in an effort to improve elastomer-metal adhesion and coating technologies. For example, U.S. Pat. Nos. 3,258,388 and 3,258,389 disclose an adhesive composition containing a rubber adherent and a metal adherent such that the adhesive will bond metal to rubber upon heating under pressure. Various metal adherents disclosed include thermosetting phenol-aldehyde resins, polymers of ethylenically unsaturated materials, and halogenated rubber such as chlorinated natural rubber or chlorinated polychloroprene. The rubber adherent basically consists of a poly-C-nitroso compound, although various other rubber adhering components may be utilized such as vulcanizable olefins.

U.S. Pat. No. 4,139,693 discloses adhesive compositions useful for bonding metal surfaces that are prepared by mixing a monomeric ester of 2-cyanoacrylic acid with an anionic polymerization inhibitor and a carboxysubstituted trihydroxy aromatic compound.

U.S. Pat. No. 4,167,500 describes an aqueous adhesive composition that contains a water dispersible novolak phenolic resin, a methylene donor such as an acetal homopolymer or acetal copolymer, and water. The phenolic resins described are primarily derived from resorcinaol and alkylphenols such as p-nonylphenol although various other polyhydroxy phenols are mentioned, such as phloroglucinol and pyrogallol.

U.S. Pat. No. 4,195,140 describes a two-component adhesion promoting composition that contains as the first component a triglycidyl isocyanurate and a methylene donor crosslinking agent and as the second component at least one methylene acceptor selected from various monomeric monohydric alkylphenols and monomeric polyhydric phenols such as phenol, p-t-butylphenol, p-phenylphenol, o-cresol, m-cresol, resorcinol, phloroglucinol, orcinol and pyrogallol.

It has been found that many traditional adhesive compositions for adhesively bonding elastomers to metal such as those described above cannot withstand the harsh high temperature fluid and corrosive material environments currently being experienced in various automotive and industrial applications. For example, many of the currently available adhesive compositions will blister or rapidly corrode when exposed to high temperature fluids or corrosive environments. Furthermore, many of the traditional adhesive compositions require substantial metal surface preparation as discussed above prior to application of the adhesive. A need therefore exists for an elastomer-metal adhesive system that will withstand these increasingly demanding and harsh environmetal conditions and that can be applied with minimal metal surface preparation to a variety of metal surfaces contaiminated with oils, rust, dirt or the like.

SUMMARY OF THE INVENTION

The present invention relates to an adhesion promoter which, when incorporated into elastomer-metal adhesive compositions or systems such that the adhesion promoter is at least in substantial contact with the metal surface, produces an elastomer-metal adhesive bond that will withstand high temperature fluid and corrosive material environments without extensive pretreatment of the metal surface. It has been discovered that a phenolic resin derived from certain trihydroxy aromatic compounds will exhibit a synergistic and unexpectedly superior bonding relationship with a metal surface. It is presently believed that the multiple hydroxy groups of the present phenolic resin enter into a heretofore undiscovered special chelation arrangement with ions on the metal surface, which results in superior bonding performance without substantial metal surface preparation. More specifically, the present adhesion promoter comprises a phenolic resin prepared from certain amounts of a monohydroxy and/or a dihydroxy aromatic compound (hereinafter "first phenolic component"), such as phenol and/or resorcinol; a trihydroxy aromatic compound (hereinafter "second phenolic component"), such as pyrogallol; and a formaldehyde source such as formaldehyde.

In another aspect, the present invention relates to a novel adhesive composition that effectively utilizes the adhesion promoter described above. The adhesive composition is a two-part adhesive system containing a primer component and an overcoat component. The primer component contains at least the phenolic resin adhesion promoter of the present invention and a halogenated polyolefin while the overcoat component contains at least a second halogenated polyolefin and a nitroso compound. This particular adhesive composition that utilizes the present adhesion promoter has been shown to exhibit substantially improved resistance to high temperature fluids and corrosive materials without extensive pretreatment of the metal surface.

It is therefore an object of the present invention to enhance the high temperature fluid and corrosive material resistance of elastomer-metal adhesive compositions.

It is another object of the present invention to provide an adhesion promoter which, when employed in adhesive compositions such that the promoter is at least in substantial contact with a metal surface, will significantly increase the high temperature fluid and corrosive material resistance of the elastomer-metal adhesive composition.

It is yet another object of the present invention to provide a specific adhesive composition that will effectively withstand high temperature fluid and corrosive material environments.

It is still another object of the present invention to provide an adhesive composition that exhibits substantially improved bonding to minimally prepared metal surfaces and that will tolerate a wide variety of metal substrates that may be contaminated with varying amounts of oil, dirt, rust and the like.

These and other objects including the provision of a method of enhancing adhesion between a metal surface and an elastomeric substrate and of a novel adhesive-bonded metal-elastomer assembly will become apparent from a consideration of the following specifications and claims.

DETAILED DESCRIPTION OF THE INVENTION

The adhesion promoter of the present invention comprises a phenolic resin prepared from certain multihydroxy aromatic compounds and a formaldehyde source which, when employed in an elastomer-metal adhesive composition such that the promoter is at least in substantial contact with the metal surface, will produce an elastomer-metal bond that will withstand harsh conditions such as high temperature fluid and corrosive material environments without extensive pretreatment of the metal surface. Specifically, the phenolic resin adhesion promoter of the present invention is prepared by combining a monohydroxy and/or a dihydroxy aromatic compound, as a first phenolic component, with a trihydroxy aromatic compound, as a second phenolic component, and a formaldehyde source under reaction conditions sufficient to create a phenolic resin that will substantially improve the environmental resistance of an elastomer-metal adhesive that employs the adhesion promoter.

The monohydroxy, dihydroxy and trihydroxy aromatic compounds of the present invention can be essentially any aromatic compound having one, two and three hydroxy substituents, respectively. The aromatic compound is preferably benzene, and the other non-hydroxy substitutents on the benzene ring or other aromatic compound may be hydrogen, alkyl, aryl, alkylaryl, arylalkyl carboxy, alkoxy, amide, imide, halogen or the like. The non-hydroxy substitutents are most preferably hydrogen and, if alkyl, are preferably lower alkyls having from one to 10 carbon atoms including methyl, ethyl, propyl, amyl, and nonyl. Representative monohydroxy compounds include phenol, p-t-butyl phenol, p-phenylphenol, p-chlorophenol, p-alkoxyphenol, o-cresol, m-cresol, o-chlorophenol, m-bromophenol, 2-ethylphenol, amyl phenol, and nonyl phenol, with phenol, p-t-butyl phenol and nonyl phenol being preferred. Representative dihydroxy compounds include resorcinol, hydroquinone and catechol with resorcinol being the preferred dihydroxy aromatic compound. The monohydroxy aromatic compound, dihydroxy aromatic compound or combination thereof comprises the first phenolic component and is utilized in the invention in an amount from about 1 to 97, preferably from about 75 to 95 percent by weight of the phenolic resin adhesion promoter.

Representative trihydroxy compounds include pyrogallol, gallates such as propyl gallate, robinetin, baptigenin and anthragallol, with pyrogallol being the preferred trihydroxy aromatic compound. The trihydroxy aromatic compound comprises the second phenolic component and is utilized in the invention in an amount from about 1 to 97, preferably from about 5 to 25 percent by weight of the phenolic resin adhesion promoter.

It should be noted that it is believed that the effectiveness of the present adhesion promoter is based on the presence of the trihydroxy aromatic compound (the second phenolic component) in the phenolic resin, and therefore, the trihydroxy aromatic compound is an essential component of the adhesion promoter. The first phenolic component of the adhesion promoter may be a monohydroxy aromatic compound, a dihydroxy aromatic compound, or a combination thereof. However, the use of at least one dihydroxy aromatic compound in the first phenolic component of the invention has been shown to exhibit exceptional bonding ability (possibly due to the numerous hydroxy groups present in the resulting resin), and a dihydroxy aromatic compound is therefore preferred for use in the first phenolic component of the invention.

The present phenolic resin adhesion promoter requires a formaldehyde source in order to react with the multi-hydroxy aromatic compounds to form a novolak phenolic resin. The formaldehyde source can essentially be any type of formaldehyde known to react with hydroxy aromatic compounds to form novolak phenolic resins. Typical compounds useful as a formaldehyde source in the present invention include formaldehyde and aqueous solutions of formaldehyde, such as formalin; acetaldehyde; propionaldehyde; isobutyraldehyde; 2-ethylbutyraldehyde; 2-methylpentaldehyde; 2-ethylhexaldehyde; benzaldehyde; as well as compounds which decompose to formaldehyde, such as paraformaldehyde, trioxane,. furfural, hexamethylenetetramine; acetals which liberate formaldehyde on heating; and the like. The formaldehyde source is utilized in an amount ranging from about 1 to 25, preferably from about 5 to 15 percent by weight of the phenolic resin adhesion promoter. When utilizing an aqueous solution of formaldehyde such as formalin, the percent by weight of formaldehyde source is based on actual formaldehyde content.

The phenolic resin adhesion promoter is typically prepared by first dissolving the first phenolic component and the second phenolic component in a suitable solvent. Solvents useful for this purpose include water; ether alcohols, such as the commercially available propylene glycol monoethyl ether sold as DOWANOL PM by the Dow Chemical Company; methylisobutyl ketone; toluene; xylene; perchloroethylene; and mixtures thereof; with DOWANOL PM or an approximately 1:1 DOWANOL PM/water mixture being the preferred solvents. The formaldehyde source is then added to the dissolved hydroxy compound mixture at a temperature of between about 80° C. and 110° C. After the resulting exothermic reaction is complete and the corresponding heat evolution is complete, a catalytic amount of an acid such as concentrated phosphoric acid, oxalic acid, sulfuric acid, hydrochloric acid or nitric acid, preferably phosphoric acid, is added to the reaction mixture and the mixture is then heated to a temperature between about 80° C. and 120° C. for a period of time ranging from about 30 minutes to 2 hours in order to complete the polymerization reaction. The mixture is allowed to cool to room temperature and an additional solvent, such as cyclohexanone, water, or an ether alcohol such as DOWANOL, can be added to the mixture in order to further solubilize the resulting resin in order to achieve a solids content of between about 30 and 70 percent, preferably between about 40 and 60 percent.

The phenolic resin adhesion promoter prepared as indicated above may then be utilized as an adhesive, primer or coating for any substrate or surface or may be incorporated into a variety of elastomer-metal adhesives or metal coatings. The present adhesion promoter can be utilized in a variety of compositions including one-part and two-part adhesive compositions, primers, or coatings in order to improve adhesive performance at the metal surface. It may be necessary to utilize an additional solvent to dissolve the adhesion promoter so as to facilitate incorporation into the corresponding adhesive or coating. Typical solvents useful for this purpose include various polar solvents such as ketones, aromatic solvents such as toluene, xylene and aliphatic solvents such as hexane or heptane, or combinations thereof, with cyclohexanone, methylethyl ketone and methyl-isobutyl ketone being the preferred solvents.

When utilizing the adhesion promoter alone or in a heat curable adhesive composition that does not inherently contain a crosslinking agent for the novolak resin, it is desirable to add a crosslinking agent that will act to fully cure or crosslink the novolak phenolic resin adhesion promoter. Typical such crosslinking agents include formaldehyde; compounds which decompose to formaldehyde such as paraformaldehyde, s-trioxane, hexamethylene tetramine, anhydroformaldehydeaniline, ethylene diamine formaldehyde; methylol derivatives of urea and formaldehyde; acetaldehyde; furfural; methylol phenolic compounds; and the like. These organic compounds are considered methylene donors in that they effect rapid crosslinking of heat fusible novolak resins with methylene or equivalent linkages by the application of heat.

Additionally, and preferred over the crosslinking agents discussed immediately above, high molecular weight aldehyde homopolymers and copolymers can be employed as a latent crosslinking agent in the practice of the present invention. A latent crosslinking agent herein refers to a crosslinking agent which will release formaldehyde only in the presence of heat such as the heat applied during the curing of an adhesive system. Typical high molecular weight aldehyde homopolymers and copolymers include acetal homopolymers, acetal copolymers, gamma-polyoxymethylene ethers having the characteristic structure:

$$R_{10}O-(CH_2O)_n-R_{11};$$

and polyoxymethylene glycols having the characteristic structure:

$$HO-(R_{12}O)_x-(CH_2O)_n-(R_{13}O)_x-H;$$

wherein $R_{10}$ and $R_{11}$ can be the same or different and each is an alkyl group having from 1 to 8, preferably 1 to 4, carbon atoms; $R_{12}$ and $R_{13}$ can be the same or different and each is an alkylene group having from 2 to 12, preferably 2 to 8, carbon atoms; n is greater than 100, and is preferably in the range from about 200 to about 2000; and x is in the range from 0 to 8, preferably 1 to 4, with at least one x being equal to at least 1. The high molecular weight aldehyde homopolymers and copolymers are further characterized by a melting point of at least 75° C., i.e., they are substantially inert with respect to the phenolic system until heat activated; and by being substantially completely insoluble in water at a temperature below the melting point. The acetal homopolymers and acetal copolymers are well-known articles of commerce. The polyoxymethylene materials are also well known and can be readily synthesized by the reaction of monoalcohols having from 1 to 8 carbon atoms or dihydroxy glycols and ether glycols with polyoxymethylene glycols in the presence of an acidic catalyst. A representative method of preparing these crosslinking agents is described in U.S. Pat. No. 2,512,950, which is incorporated herein by reference. Gamma-polyoxymethylene ethers are generally preferred sources of latent formaldehyde and a particularly preferred latent crosslinking agent for use in the practice of the invention is 2-polyoxymethylene dimethyl ether. If utilized, the crosslinking agent is employed in an amount ranging from about 1 to 95, preferably from about 10 to 30 percent by weight of the total weight of the adhesion promoter.

It is imperative that the present adhesion promoter be utilized in such compositions so that the promoter is substantially in contact with the metal surface. "Substantially in contact" herein refers to at least minimal physical contact between the phenolic resin and the metal surface. It has presently been discovered that a resin derived from at least one trihydroxy aromatic compound (as distinguished from a monohydroxy and/or a dihydroxy aromatic compound, etc.) exhibits synergistically improved bonding characteristics at the metal surface, possibly due to a special chelation arrangement of hydroxy groups and metal ions. This improved bonding performance is particularly evident when the phenolic resin is prepared from a trihydroxy aromatic compound in combination with a dihydroxy aromatic compound. It is therefore extremely important to apply the present phenolic resin so that it is in substantial contact with the metal surface. For example, if a primer is first applied to the metal surface, the phenolic resin adhesion promoter should be admixed with the primer prior to application. In the case of a one-component adhesive, care must be taken to ensure that a sufficient amount of resin is utilized and that the resin is thoroughly mixed in the adhesive so that the resin will be guaranteed to contact the metal surface. As described above, the present adhesion promoter can also be used alone as an adhesive, primer, or coating applied directly to the metal surface.

Referring now more specifically to the other aspect of the invention, the present adhesion promoter has been found to significantly improve the bonding performance of a two-part adhesive system comprising a primer component that is applied at least in substantial contact with a metal surface and an overcoat component that is applied at least in substantial contact with an elastomeric substrate. The primer component of the present adhesive system comprises the phenolic resin adhesion promoter described above in combination with at least a halogenated polyolefin. The overcoat component can essentially be any rubber-adhering material previously known in the art but preferably comprises at least a second halogenated polyolefin and a nitroso compound.

The primer component of the two-part adhesive system comprises the phenolic resin adhesion promoter as described in detail above and a halogenated polyolefin. The halogenated polyolefin can essentially be any natural or synthetic halogenated polyolefin elastomer. The halogens employed in the halogenated polyolefinic elastomer are typically chlorine or bromine, preferably chlorine, although fluorine can also be used. Mixtures of halogens can also be employed, in which case the halogen-containing polyolefinic elastomer will have more than one type of halogen substituted thereon. The amount of halogen does not appear critical and can range from as low as about 3 weight percent to more than 70 weight percent, depending on the nature of the base elastomer or polymer. Halogenated polyolefins and their preparation are well known to those skilled in the art.

Representative halogenated polyolefins include chlorinated ethylene propylene copolymer rubber, chlorinated natural rubber, chlorinated ethylene propylene diene terpolymer rubber (EPDM), chlorosulfonated polyethylene, chlorine- and bromine-containing synthetic rubbers including polychloroprene, chlorinated polychloroprene, chlorinated polybutadiene, hexachloropentadiene, hexachloropentadiene-butadiene polymer adducts, chlorinated butadiene styrene copolymers, chlorinated polyethylene, polydichlorobutadienes, brominated poly(2,3-dichloro-1,3-butadiene), copolymers of α-chloroacrylonitrile and 2,3-dichloro-1,3-butadiene, 2,3-dichloro-1,3-butadiene homopolymers, chlorinated poly(vinyl chloride), and the like, including mixtures of such halogen-containing elastomers. Thus substantially any of the known halogen-containing derivatives of natural and synthetic elastomers can be employed in the practice of this invention, including mixtures of such elastomers. At the present time, chlorinated ethylene-propylene copolymer rubber, polydichlorobutadienes, chlorinated EPDM, and chlorosulfonated polyethylene constitute preferred halogenated polyolefins for use in the present invention. The halogenated polyolefin is normally utilized in an amount from about 1 to 97 percent by weight, preferably from about 30 to 70 percent by weight of the primer component.

The phenolic resin adhesion promoter described above is combined with the halogenated polyolefin to create the primer component of the present invention. The phenolic resin adhesion promoter is typically utilized in an amount from about 1 to 97, preferably from about 25 to 60 percent by weight of the primer component.

An additional non-trihydroxy aromatic compound phenolic resin can optionally be combined with the primer component in order to provide compatability among the primer components and to add flexibility to the final adhesive. Such phenolic resins include well-known phenolic resins derived from, for example, phenol, m-cresol, o-cresol, p-t-butyl phenol, p-phenylphenol, p-chlorophenol, p-alkoxyphenol, o-chlorophenol, m-bromophenol, 2-ethylphenol, amyl phenol, nonyl phenol, or combinations thereof and the like. A preferred additional phenolic resin is derived from an approximate 1:1 ratio of phenol and m-cresol and has a molecular weight between about 200 and 1000, preferably between about 400 and 600. If utilized, the additional phenolic resin is employed in an amount ranging from about 1 to 90, preferably about 10 to 50 percent by weight of the primer component.

When forming the primer component of the present invention, it is desirable to add an additional amount of the high molecular weight aldehyde homopolymers or copolymers, described above, as a latent crosslinking agent in order to provide a latent source of formaldehyde which will be released only during the curing step of the application of the adhesive. The additional formaldehyde source is preferably a gammapolyoxymethylene ether such as 2-polyoxymethylene dimethyl ether. The additional formaldehyde source is utilized in an amount ranging from about 1 to 50, preferably about 10 to 30 percent by weight of the primer component.

Solvent may also be required in order to adjust the viscosity of the primer component such that the primer may be applied at a layer thickness of between about 0.05 and 2.0 mils, perferably between about 0.1 and 0.5 mils. Typical additional solvents include cyclohexanone, methylethyl ketone and methylisobutyl ketone with cyclohexanone being preferred.

The primer component can optionally contain other well-known additives including plasticizers, fillers, pigments, reinforcing agents and the like, in amounts employed by those skilled in the adhesive arts to obtain the desired color and consistency. Typical additional additives include titanium dioxide, carbon black and zinc oxide.

The overcoat component can essentially be any rubber-adhering material, such as those materials disclosed in U.S. Pat. Nos. 2,900,292, 3,258,388, and 3,258,389. The overcoat component has been found to exhibit exceptional performance, however, when the overcoat component contains at least a halogenated polyolefin and a nitroso compound.

The halogenated polyolefin of the overcoat component can be any halogenated polyolefin as described above with respect to the primer component and is preferably chlorinated natural or synthetic rubber, brominated poly (2,3-dichloro-1,3-butadiene) or chlorosulfonated polyethylene, and is most preferably a combination of chlorinated rubber and brominated poly(2,3-dichloro-1,3-butadiene). The halogenated polyolefin is utilized in an amount ranging from about 1 to 99, preferably from about 30 to 70 percent by weight of the overcoat component.

The nitroso compound can be selected from any of the aromatic hydrocarbons, such as benzenes, naphthalenes, anthracenes, biphenyls, and the like, containing at least two nitroso groups attached directly to nonadjacent ring-carbon atoms. More particularly, such nitroso compounds are described as aromatic compounds having from 1 to 3 aromatic nuclei, including fused aromatic nuclei, having from 2 to 6 nitroso groups attached directly to nonadjacent nuclear-carbon atoms. The present preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, arylalkyl, alkylaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

$$(R)_m-Ar-(NO)_2$$

wherein Ar is selected from the group consisting of phenylene and naphthalene; R is a monovalent organic radical selected from the group consisting of alkyl, cycloalkyl, aryl, arylalkyl, alkylaryl, arylamine, and alkoxy radicals having from 1 to 20 carbon atoms, amino, or halogen, and is preferably an alkyl group having from 1 to 8 carbon atoms; and m is zero, 1, 2, 3, or 4, and preferably is zero.

A partial nonlimiting listing of nitroso compounds which are suitable for use in the practice of the invention include p-dinitrosobenzene, m-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4-dinitrosobenzene, 2-fluoro-1,4-dinitrosobenzene, 2-methoxy-1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene. The nitroso compound component is typically utilized in an amount from about 1 to 50, preferably from about 5 to 20 percent by weight of the overcoat component.

The overcoat component of the invention can optionally contain other well-known additives including plasticizers, fillers, pigments, reinforcing agents and the like, in amounts employed by those skilled in the adhesive arts to obtain desired color and consistency.

The components of the present invention are typically applied in liquid solvent form by utilizing a variety of solvents to dissolve each respective component. Solvents useful for dissolving the primer component include various polar solvents such as ketones, aromatic solvents such as toluene, xylene and aliphatic solvents such as hexane or heptane, or combinations thereof, with cyclohexanone, methyl-ethyl ketone and methylisobutyl ketone being the preferred solvents for the primer component. The solvent for the primer component is utilized in an amount sufficient to provide a coating composition having a viscosity that will result in the application of a layer thickness of between about 0.05 and 2.0 mils, preferably between about 0.1 and 0.5 mils. Solvents useful for dissolving the overcoat component include various aromatic solvents such as xylene, toluene, chlorobenzene, dichlorobenzene and halogenated aliphatic hydrocarbons such as trichloroethylene, perchloroethylene, and propylene dichloride, with xylene and toluene being the preferred solvents for the overcoat component. The solvent for the overcoat component is utilized in an amount sufficient to provide a coating composition having a viscosity that will result in the application of a layer thickness of between about 0.05 and 2.0 mils, preferably between about 0.1 and 0.5 mils. The components of the present invention can also be applied as an aqueous formulation. When the adhesive of the present invention is applied in aqueous form, the halogenated polyolefin of both the primer component and the overcoat component should be prepared by emulsion polymerization techniques known in the art.

The primer component is typically applied to the surface of the metal to be bonded after which the overcoat component is applied to the coated metal surface although in some applications involving the bonding of post-vulcanized rubber, it may be possible to apply the overcoat component directly to the rubber substrate.

In order to cure or crosslink the primer component and the overcoat component to create the permanent rubber-metal bond, the surface of the metal and the rubber substrate are brought together under a pressure of from about 20.7 to 172.4 Mega Pascals (MPa), preferably from about 20 MPa to 50 MPa. The resulting rubber-metal assembly is simultaneously heated to a temperature of from about 140° C. to about 200° C., preferably from about 150° C. to 170° C. The assembly should remain under the applied pressure and temperature for a period of from about 3 minutes to 60 minutes, depending on the cure rate and thickness of the rubber substrate. This process may be carried out by applying the rubber substrate as a semimolten material to the metal surface as in, for example, an injectionmolding process. The process may also be carried out by utilizing compression molding, transfer molding or autoclave curing techniques. After the process is complete, the bond is fully vulcanized and ready for use in a final application.

The substrate, which may be bonded to a surface such as a metal surface in accordance with the present invention, can essentially be any substrate capable of receiving the adhesive, is preferably a polymeric substrate, and is most preferably an elastomer substrate selected from any of the natural rubbers and olefinic synthetic rubbers including polychloroprene, polybutadiene, neoprene, Buna-S, Buna-N, butyl rubber, brominated butyl rubber, nitrile rubber, and the like. The substrate may also be a thermoplastic elastomer such as the thermoplastic elastomers sold under the tradenames SANTOPRENE and ALCRYN by Monsanto and DuPont, respectively. The surface to which the substrate is bonded can be any surface capable of receiving the adhesive and is preferably a metal selected from any of the common structural metals such as iron, steel (including stainless steel), lead, aluminum, copper, brass, bronze, Monel metal, nickel, zinc, and the like. The two-part adhesive system of the present invention has been found to be particularly useful for bonding rubber to steel.

The following examples are presented in order to further illustrate the invention but are not intended to limit in any matter the scope of the invention.

PREPARATION OF PHENOLIC RESIN ADHESION PROMOTORS

Example 1

To a 2-liter flask equipped with a dropping funnel are added 45.0 g of pyrogallol, 50.0 g of resorcinol, and 58.0 g of DOWANOL PM as a solvent. After the hydroxy compounds are dissolved at 95° C. in the solvent, 13.5 g of formalin (37% aqueous solution of formaldehyde) is added to the mixture using an addition funnel to control the exothermic nature of the reaction as necessary. After the reaction ceases evolving heat, 2.0 g of concentrated phosphoric acid is added to the reaction and the reaction mixture is heated at 95° C. for 1 hour. After cooling to room temperature, 33.0 g of cyclohexanone is added to the flask to solubilize the mixture to a total solids content of approximately 50 percent.

Examples 2-7

Phenolic resins are prepared as in Example 1 utilizing the amounts of ingredients listed below in Table 1. Each of Examples 2-7 utilized 2.0 g of phosphoric acid as a catalyst.

TABLE 1

| Example | Amt. of Resorcinol (g) | Amt. of Pyrogallol (g) | Amt. of Formalin (g) | Amt. of Dowanol PM (g) | Amt. of Cyclohexanone (g) |
|---|---|---|---|---|---|
| 2 | 70.0 | 20.0 | 27.0 | 46.0 | 33.0 |
| 3 | 50.0 | 40.0 | 27.0 | 83.0 | — |
| 4 | 50.0 | 50.0 | 0.0 | 100.0 | — |
| 5 | 90.0 | 0.0 | 27.0 | 83.0 | — |
| 6 | 95.0 | 0.0 | 13.5 | 91.5 | — |
| 7 | 100.0 | 0.0 | 0.0 | 100.0 | — |

PREPARATION OF ADHESIVE PRIMER

Adhesive primers 1-7 are prepared by combining the ingredients shown in Table 2.

TABLE 2

| Primer | Base Primer[b] (g) | Adhesion Promoter (12.5 g from Example #) | 2-polyoxymethylene dimethyl ether[c] (g) | Cyclohexanone (g) |
|---|---|---|---|---|
| 1 | 100 | Example 1 | 6.25 | 75 |
| 2 | 100 | Example 2 | 6.25 | 75 |
| 3 | 100 | Example 3 | 6.25 | 70 |
| 4 | 100 | Example 4 | 6.25 | 68 |
| 5 | 100 | Example 5 | 6.25 | 65 |
| 6 | 100 | Example 6 | 6.25 | 60 |
| 7 | 100 | Example 7 | 6.25 | 55 |

[b]Base Primer

1. Chlorinated ethylene-propylene copolymer rubber (Cl content approximately 60%) — 100.0 g
2. Carbon black — 20.0 g
3. $TiO_2$ — 50.0 g
4. ZnO — 20.0 g
5. Phenol/m-cresol (approx. 1:1 ratio) phenolic resin (MW approx. 500) — 43.3 g
6. Cyclohexanone — 400.0 g

[c]30% dispersion in xylene solvent

UTILIZATION OF ADHESIVE PRIMER WITH OVERCOAT: HIGH TEMPERATURE FLUID BONDING RESULTS

The adhesive primers 1-7 prepared as above were each applied to degreased, grit-blasted, 1010 cold-rolled steel by dipping steel coupons in the primers to form a primer thickness between 0.30 and 0.39 mils. To the coated steel was applied a commercial overcoat (Chemlok ® 220, Lord Corporation) containing chlorinated rubber, brominated poly(2,3-dichlorobutadiene) and p-dinitrosobenzene to form an overcoat thickness between about 0.6 and 1.0 mils. The coated steel was then bonded to sulfurcured semi-EV natural rubber (stock #E-218) by transfer molding at a temperature of approximately 307° F. for 15 minutes. The bonded rubber-metal assemblies were then prepared according to the procedure utilized in ASTM-D-429-B and were subjected to the boiling water test described below. The results of the test are shown in Table 3.

BOILING WATER TEST

Six rubber-metal coupons were prepared according to ASTM-D-429-B utilizing each of the primers 1-7. The leading edge of each of the bonded rubber coupons was stressed by tying it back to 180° of its original position. This stressed leading edge interface was exposed to boiling water by first scoring it with a razor blade, and then the stressed coupon was immersed in boiling water for 2 hours. After this time, the part was removed from the boiling water, cooled, and destructively tested by peeling back the remaining bonded area. The amount of rubber retained on the bonded area is recorded as a percentage of the bonded area. Rubber retained on the bonded area indicates that the adhesive bond was stronger than the rubber itself and a high degree of rubber retention is therefore desirable. Each of the six coupons were tested for each primer and the rubber retention values listed below represent the average of the six values.

TABLE 3

| Primer | Boiling Water Test Results % Rubber Rentention |
|---|---|
| 1 | 92 |
| 2 | 100 |
| 3 | 98 |
| 4 | 97 |
| 5 | 78 |
| 6 | 73 |
| 7 | 57 |

As can be seen from the above data, a phenolic resin derived from the unique combination of dihydroxy and trihydroxy aromatic compounds (Examples 1, 2, 3, and 4), when utilized in an adhesive system, provides excellent adhesive bonds which resist boiling water, as compared to phenolic resins derived solely from a dihydroxy aromatic compound (Examples 5, 6, and 7).

USE OF ADHESION PROMOTOR TO BOND MINIMALLY PREPARED STEEL

Example 8—Preparation of Adhesion Promoter

To a 1-L flask with dropping funnel and reflux condenser are added 12.8 g of pyrogallol, 210.9 g of resorcinol and 131.9 g of DOWANOL PM. The mixture is dissolved at 95° C. on a steam bath and to the dissolved mixture is slowly added 108 g of formalin over a 15-minute period. The exothermic reaction causes the reaction temperature to increase to over 100° C. and when the exotherm has subsided, to the mixture is added 0.5 g of 85% phosphoric acid. The mixture is then heated at 95° C. for one hour after which 64 g of water is added to the mixture.

Examples 9-11

Adhesion promoters were prepared as in Example 8 using the ingredients listed below in Table 4. Each of Examples 9-11 included 73.0 g of formalin, 88.5 g of DOWANOL, 0.5 g of phosphoric acid, and 42.5 g of water.

TABLE 4

| Example | Amount of Resorcinol (g) | Amount of Pyrogallol (g) |
|---|---|---|
| 9 | 142 | 9.0 |
| 10 | 112 | 43.5 |
| 11 | 150 | 0.0 |

PREPARATION OF ADHESIVE AND TEST COUPONS

To a 150-g sample of each of the respective adhesion promoters prepared above was added 11.25 g of dry 2-polyoxymethylene dimethyl ether. The resulting adhesive was neutralized with dilute ammonium hydroxide to pH 7 and diluted with water so that test coupons dipped into the adhesive received a coating having a thickness of between about 0.3 and 0.4 mils.

The one-part adhesive so prepared was applied to both 1010 cold-rolled steel that had been degreased without grit-blasting and to similar steel that had been both degreased and grit-blasted. The steel coupons were dipped in each of the adhesives to apply an adhesive thickness of between about 0.3 and 0.4 mils. The coated coupons were bonded to two nitrile rubber stocks designated HC600-B and K125-SX, respectively, by transfer molding at a temperature of approximately 307° F. for 22 minutes. Rubber retention was tested according to ASTM D-429-B. The notation "#/ in." indicates pounds of force per linear inch of bonded area required to peel the rubber from the metal surface according to ASTM D-429-B. The values indicated represent the average value of 3 coupons tested.

Example 8 was tested using K125-SX rubber/degreased steel and showed 142 #/in. with 100 percent rubber retention, which is the highest level of adhesion possible. The results for Examples 9-11 are shown below in Table 5.

TABLE 5

| Adhesive | #/in. | % Rubber Retention |
|---|---|---|
| HC600-B Rubber/Degreased Steel | | |
| Example 9 | 98 | 82 |
| Example 10 | 69 | 100 |
| Example 11 | 54 | 78 |
| HC600-B Rubber/Degreased, Grit-Blasted Steel | | |
| Example 9 | 103 | 98 |
| Example 10 | 68 | 100 |
| Example 11 | 70 | 37 |
| K125-SX Rubber/Degreased Steel | | |
| Example 9 | 135 | 85 |
| Example 10 | 129 | 98 |
| Example 11 | 60 | 38 |
| K125-SX Rubber/Degreased, Grit-Blasted Steel | | |
| Example 9 | 137 | 100 |
| Example 10 | 136 | 100 |
| Example 11 | 105 | 50 |

The above data clearly indicate that an adhesive utilizing the present dihydroxy/trihydroxy aromatic compound phenolic resin adhesion promoter can effectively bond to minimally prepared (degreased only) steel and shows surprisingly superior bonding results (Examples 8, 9, and 10) when compared to an adhesive utilizing a phenolic resin based only on a dihydroxy aromatic compound (Example 11).

What is claimed is:

1. A method of bonding a surface of metal to an elastomeric substrate comprising the steps of:
    applying a primer component at least in substantial contact with the metal surface; and
    applying an overcoat component at least in substantial contact with the elastomeric substrate and forcing the surface against the substrate at a pressure of between about 20.7 and 172.4 MPa, at a temperature of between about 140° C. and 200° C., and for a period of time between about 3 and 60 minutes;
    wherein the primer component comprises (a) as an adhesion promoter, a novolak phenolic resin derived from a first phenolic component, a second phenolic component, and a formaldehyde source, wherein the first phenolic component is a monohydroxy aromatic compound, a dihydroxy aromatic compound or a combination thereof, and the second phenolic component is a trihydroxy aromatic compound; and (b) a first halogenated polyolefin; and wherein the overcoat component comprises a rubber-adhering material.

2. A method according to claim 1 wherein the primer component further comprises a crosslinking agent.

3. A method according to claim 1 wherein the overcoat component comprises (a) a second halogenated polyolefin and (b) a nitroso compound.

4. An adhesively bonded elastomer-metal assembly prepared according to the method of claim 1.

5. A two-part adhesive composition comprising a primer component and an overcoat component; wherein the primer component comprises (a) as an adhesion promoter, a novolak phenolic resin derived from a first phenolic component, a second phenolic component, and a formaldehyde source, wherein the first phenolic component is a monohydroxy aromatic compound, a dihydroxy aromatic compound or a combination thereof, and the second phenolic component is a trihydroxy aromatic compound; and (b) a first halogenated polyolefin; and wherein the overcoat component comprises a rubber-adhering material.

6. An adhesion promoting composition according to claim 5 wherein the first phenolic component is a monohydroxy aromatic compound selected from the group consisting of phenol, p-t-butyl phenol, p-phenylphenol, p-chlorophenol, p-alkoxyphenol, o-cresol, m-cresol, o-chlorophenol, m-bromophenol, 2-ethylphenol, amyl phenol, and nonyl phenol.

7. A composition according to claim 5 wherein the first phenolic component is a dihydroxy aromatic compound selected from the group consisting of resorcinol, hydroquinone, and catechol.

8. A composition according to claim 5 wherein the trihydroxy aromatic compound is selected from the group consisting of pyrogallol, gallates, robinetin, baptigenin and anthragallol.

9. A composition according to claim 5 wherein the formaldehyde source is selected from the group consisting of formaldehyde, formalin, acetaldehyde, propionaldehyde, isobutyraldehyde, and paraformaldehyde.

10. A composition according to claim 6 wherein the monohydroxy aromatic compound is phenol.

11. A composition according to claim 7 wherein the dihydroxy aromatic compound is resorcinol.

12. A composition according to claim 8 wherein the trihydroxy aromatic compound is pyrogallol.

13. A composition according to claim 9 wherein the formaldehyde source is formalin.

14. A composition according to claim 5 wherein the primer component further comprises a crosslinking agent.

15. A composition according to claim 14 wherein the crosslinking agent is selected from the group consisting of formaldehyde, paraformaldehyde, s-trioxane, hexamethylene tetramine, ethylene diamine formaldehyde, acetal homopolymers, acetal copolymers, gammapolyoxymethylene ethers, and polyoxymethylene glycols.

16. A composition according to claim 15 wherein the crosslinking agent is a gamma-polyoxymethylene ether.

17. A composition according to claim 16 wherein the gammapolyoxymethylene ether is 2-polyoxymethylene dimethyl ether.

18. An adhesive composition according to claim 5 wherein the first halogenated polyolefin is selected from the group consisting of chlorinated ethylene propylene copolymer rubber, chlorinated ethylene propylene diene terpolymer rubber, polydichlorobutadienes, and chlorosulfonated polyethylene.

19. An adhesive composition according to claim 18 wherein the first halogenated polyolefin is chlorinated ethylene propylene copolymer rubber.

20. An adhesive composition according to claim 5 wherein the primer component further comprises a non-trihydroxy aromatic compound phenolic resin.

21. An adhesive composition according to claim 20 wherein the non-trihydroxy aromatic compound phenolic resin is selected from the group consisting of phenolic resins derived from phenol, m-cresol, o-cresol, p-t-butylphenol, and p-phenylphenol.

22. An adhesive composition according to claim 21 wherein the non-trihydroxy aromatic compound phenolic resin is a resin derived from an approximate 1:1 ratio of phenol and m-cresol and has a molecular weight of between about 200 and 1000.

23. An adhesive composition according to claim 22 wherein the phenolic resin has a molecular weight of between about 400 and 600.

24. An adhesive composition according to claim 5 wherein the overcoat component comprises (a) a second halogenated polyolefin and (b) a nitroso compound.

25. An adhesive composition according to claim 24 wherein the second halogenated polyolefin is selected from the group consisting of brominated poly-2,3-dichlorobutadiene, chlorinated rubber, a mixture thereof, and chlorosulfonated polyethylene.

26. An adhesive composition according to claim 25 wherein the second halogenated polyolefin is brominated poly-2,3-dichlorobutadiene.

27. An adhesive composition according to claim 24 wherein the nitroso compound is selected from the group consisting of p-dinitrosobenzene, m-dinitrosobenzene, m-dinitrosonaphthalene, and p-nitrosonaphthalene.

28. An adhesive composition according to claim 27 wherein the nitroso compound is p-dinitrosobenzene.

* * * * *